US007555107B2

(12) United States Patent
Anupam et al.

(10) Patent No.: US 7,555,107 B2
(45) Date of Patent: Jun. 30, 2009

(54) "ROAMING" METHOD AND APPARATUS FOR USE IN EMULATING A USER'S "HOME" TELECOMMUNICATIONS ENVIRONMENT

(75) Inventors: Vinod Anupam, Bridgewater, NJ (US); Markus Andreas Hofmann, Fair Haven, NJ (US); Wim Sweldens, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1204 days.

(21) Appl. No.: 10/748,375

(22) Filed: Dec. 30, 2003

(65) Prior Publication Data
US 2005/0147226 A1  Jul. 7, 2005

(51) Int. Cl.
*H04M 3/42* (2006.01)
(52) U.S. Cl. .................... 379/201.02; 379/201.12; 379/210.02; 379/211.02; 379/912; 455/414.1
(58) Field of Classification Search ............ 379/210.02, 379/211.02, 201.12, 912; 455/414.1
See application file for complete search history.

(56) References Cited

U.S. PATENT DOCUMENTS

| 4,899,373 | A | * | 2/1990 | Lee et al. ............... | 379/201.05 |
|---|---|---|---|---|---|
| 5,063,592 | A | | 11/1991 | Cannella .................... | 379/207 |
| 5,237,604 | A | | 8/1993 | Ryan .......................... | 379/220 |
| 5,353,331 | A | * | 10/1994 | Emery et al. ............... | 455/461 |
| 5,764,639 | A | * | 6/1998 | Staples et al. .............. | 370/401 |
| 6,622,016 | B1 | * | 9/2003 | Sladek et al. ............. | 455/414.1 |
| 6,823,055 | B1 | * | 11/2004 | Mayer et al. ........... | 379/201.05 |
| 7,149,297 | B2 | * | 12/2006 | Idoni et al. ............. | 379/201.02 |
| 7,151,825 | B2 | * | 12/2006 | Idoni et al. ............. | 379/201.02 |

OTHER PUBLICATIONS

BellSouth SWA FGA—BellSouth Interconnection Services, 2003. http://www.interconnection.bellsouth.com/products/swa/SWA_FGA.html.
Wireless Intelligent Network (WIN), 2003. http://www.iec.org/online/tutorials/win/.

* cited by examiner

*Primary Examiner*—Harry S Hong
(74) *Attorney, Agent, or Firm*—Kenneth M. Brown

(57) ABSTRACT

The concept of "roaming" is extended to wireline networks with a network hosted technique which emulates a wireline telecommunications network user's environment when the user is using a wireline telecommunications device located at a physical location other than his or her "home" location, or when using a wireline or wireless telecommunications device other than his or her own regardless of the location. Any telephone or other telecommunications device being used by the user advantageously appears to be logically connected directly to his or her home telecommunications network, irrespective of the location of the telephone or other telecommunications device being used and the telecommunications network to which that device is actually connected.

22 Claims, 6 Drawing Sheets

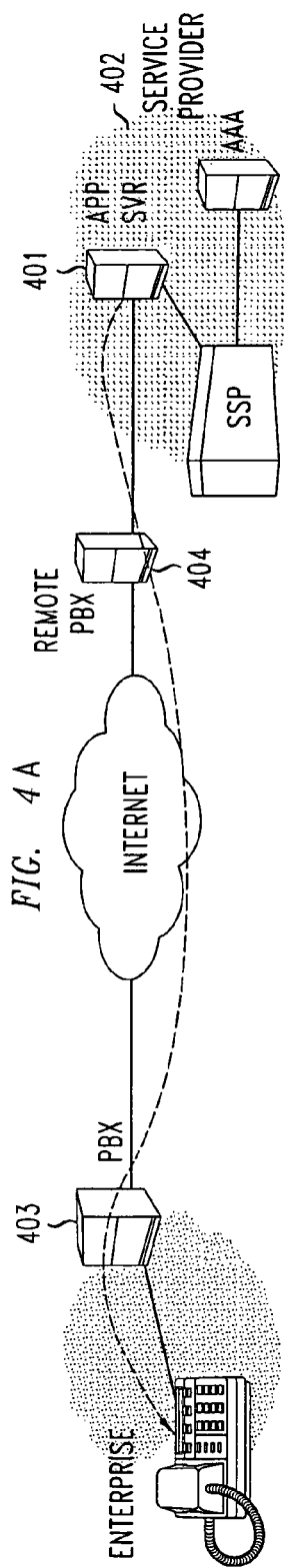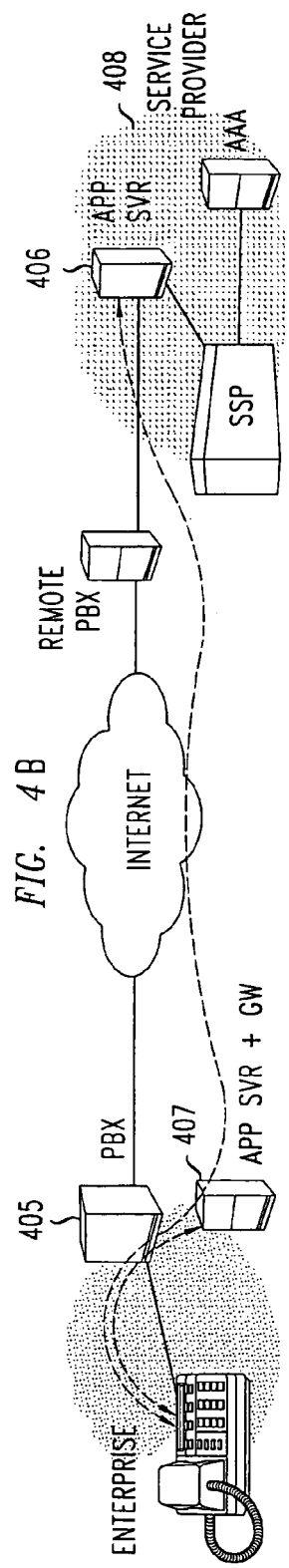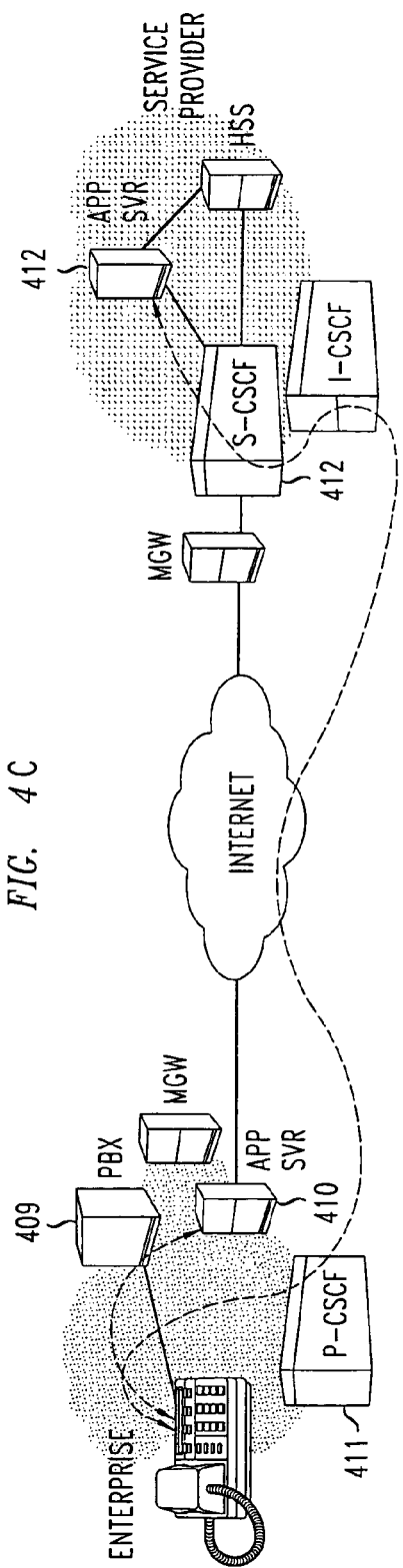

"ROAMING" METHOD AND APPARATUS FOR USE IN EMULATING A USER'S "HOME" TELECOMMUNICATIONS ENVIRONMENT

FIELD OF THE INVENTION

The present invention relates generally to the field of telecommunications and more particularly to a method and apparatus for emulating a telephone user's telecommunications "environment" when the user is using a telephone line or telecommunications device other than his or her own.

BACKGROUND OF THE INVENTION

The concept of "roaming" in wireless telephone networks is well known. It allows a wireless telecommunications network service subscriber with a mobile device (e.g., a cell phone) to travel into the geographical territory of a different wireless network while still being able to use the mobile device. The mobile device registers itself with the visited network and the subscriber is subsequently enabled to use the mobile device (which is considered to have "roamed" into the visited network) essentially as if it were still located within the geographical boundaries of the user's own "home" network. The home network and the visiting network will typically have explicit agreements which support the ability for each other's subscribers to roam into the other network's area. And in most cases, the user is provided with the same full functionality as if he or she remained in the territory of the home network—partly as a result of using the same physical device and partly as a result of functionality explicitly provided by the visiting network.

In particular, that is, an inherent advantage to the concept of wireless "roaming" is that the user typically not only has the full functionality that he or she normally has, but the user's telecommunications "environment" appears no different when roaming than when he or she is using his or her mobile device within its home area. Most importantly, the user's cellular phone number travels with him or her (for purposes of incoming calls), since that number is specifically associated with the physical cell phone itself. Of course, none of this seems at all "unnatural" to us, because the mobile terminal (e.g., the cell phone) is in fact the same physical device that is merely being carried from place to place. And it is common to mentally associate the functionality, features and telephone number of our wireless telecommunications "environment" with the physical device itself, even though for many of these features (e.g., voice messaging), the functionality is actually provided within the telecommunications network and not within the cell phone itself.

On the other hand, whenever we use a wireline telephone at a location other than our home or office, it is almost invariably not the same physical device, and therefore it is not "expected" that it will behave identically to our "normal" telephone at our home or office. We fully accept, for example, that the dial tone may sound different, that our preprogrammed "speed dials" will not be available, and that we may not have available to us the same special feature functionality such as conference calling, call transfers, placing calls on hold and multiple line capability. And again, most significantly for the purpose of receiving incoming calls, we accept that we are "located" at a different phone number, although conventional call forwarding techniques can partially alleviate this problem.

Quite often, for example, a company employee (generically, an "associate" of an "enterprise") who regularly works in a conventional office environment, needs to travel or temporarily relocate to another location for business purposes. When "at home" in his or her office, the telecommunications system the employee will use will most typically comprise either a conventional PBX (Public Branch Exchange) system or a conventional Centrex system. (PBX and Centrex systems are fully familiar to those of ordinary skill in the art.) As such, the "environment" (e.g., the features and functionality) available to the employee will be dictated by the particular PBX or Centrex system in combination with the physical telephone in his or her office. Moreover, the phone number at the employee's office will be fixed—typically either a direct (e.g., 10-digit) phone number for Centrex systems, or a (10-digit) phone number plus an extension for PBX systems.

However, when the employee is away from his or her office, being physically situated in a hotel room, in a public phone booth, or in another office in, for example, another office building, the employee will have to use the telecommunication system available without having the convenience and functionality that he or she has in his or her office. And while conventional call forwarding techniques may in some cases be used to automatically redirect incoming calls from the employee's office phone to the phone at the location where he or she is presently situated, it cannot otherwise recreate the office wireline telecommunications environment. Thus, it would be highly desirable if a wireline telecommunications system could provide for the ability for a telecommunications system user to have the same telecommunications "environment" while using any physical device (e.g., telephone) or, for that matter, any physical telephone line (e.g., "landline"), and to thereby make the device at the user's location appear the same as the user's "home" phone for both incoming and outgoing call functionality. (As used herein, a "home" phone is any wireline or wireless telecommunications device which is used on a regular basis by the user, such as the user's home or office telephone. Also as used herein, the term "telecommunications device," when used without qualification, is intended to include any device capable of serving as a telecommunications user terminal, including, without limitation, conventional wireline telephones, cellular telephones, Personal Data Assistants or PDAs with telecommunications capability, computers with Internet or other networking capability, etc.)

SUMMARY OF THE INVENTION

In accordance with the principles of the present invention, a method of extending the concept of "roaming" to wireline networks is provided. Such "roaming" is advantageously accomplished by emulating a telecommunications network user's home environment when the user is using a wireline telecommunications device located at a physical location other than his or her "home" location, or when using a wireline or wireless telecommunications device other than his or her own regardless of the location. Specifically, in accordance with certain illustrative embodiments of the present invention, any telephone or other telecommunications device may be advantageously treated as if it were logically connected directly to a specific telecommunications network (e.g., a "home" network associated with a given user), irrespective of the telephone or other telecommunications device being used, its physical location, or the telecommunications switch to which that device is actually connected. It is assumed herein that the service providers of the local switch and the remote switch, assuming that they are different, have a "roaming" agreement between them.) Advantageously, the remote telephone then behaves either like a dynamically provisioned OPX (Off Premises Extension) in the case of a PBX-based home telecommunications environment, or like a dynamically provisioned FX (Foreign Exchange) for a switch-based (e.g., Centrex-based) home telecommunications environment. (An OPX and an FX are each fully familiar to those of ordinary skill in the art.) More particularly, in accordance with an illustrative embodiment of the present invention, a wireline telecommunications system provides a network hosted technique that advantageously extends a user's personalized telecommunications environment from a "home" (e.g., home or office) telephone to any physical device (e.g., telephone) or any physical telephone line (e.g., "land line") located anywhere. In particular, a method for emulating a home telecommunications environment is provided, wherein a remotely located telephone or other telecommunications device (i.e., any telecommunications device at a location other than the user's "home" location) is used in a manner which recreates the user's "home" (e.g., wireline) telecommunications environment by performing the steps of (a) receiving a request from the user to initiate such an emulation; (b) receiving authenticating information from the user indicating his or her association with the home telecommunications environment; (c) determining a "home" telecommunications network associated with the user's home telecommunications environment; and (d) instructing a telecommunications network associated with the remote telecommunications device to process signaling information associated with the user's use of the remote telecommunications device based on the determined home telecommunications network. For example, in accordance with one illustrative embodiment of the present invention in which an IN (Intelligent Network) architecture is employed, the remote telecommunications network advantageously interprets the signaling information based on information received from the determined home telecommunications network. In accordance with another illustrative embodiment of the present invention in which an IMS (IP Multimedia Subsystem) architecture is employed, the remote telecommunications network advantageously redirects the signaling information to the determined home telecommunications network to be handled directly thereby.

BRIEF DESCRIPTION OF THE DRAWINGS

FIG. 4 shows an example telecommunications network in which a fourth illustrative embodiment of the present invention may be advantageously implemented, the fourth illustrative embodiment for supporting the use of PBX extensions; FIG. 4A shows access to a "home" PBX extension; FIG. 4B shows the use of a PBX extension at remote locations; and FIG. 4C shows the use of PBX systems with IMS architectures.

DETAILED DESCRIPTION OF THE ILLUSTRATIVE EMBODIMENTS

In accordance with one illustrative implementation of the present invention, each service provider who is party to a roaming agreement among service providers runs an entity which will be referred to herein as a "roaming proxy" in their network. Typically, the roaming proxy will comprise a telephony application server ("app server") adjacent to a switch. Then, as described above, a user with a wireline telephone goes off-hook, interacts with an identification server, and authenticates him or herself. For example, the user may dial a predetermined phone number to perform this registration (i.e., authentication) task. (In accordance with other illustrative embodiments of the invention, a "smart" wireline telephone may identify itself directly to the identification server.)

Based on the received identification information, the roaming proxy determines the "home" network for the user. Then, all signaling information is processed based on the determined home network, such that the use of the remotely located telephone functions as if it were connected directly to the home network (e.g., to the home network switch). In accordance with one illustrative embodiment of the present invention in which an IN (Intelligent Network) architecture is employed, the remote telecommunications network advantageously interprets the signaling information based on information received from the determined home telecommunications network. In accordance with another illustrative embodiment of the present invention in which an IMS (IP Multimedia Subsystem) architecture is employed, the remote telecommunications network advantageously redirects the signalling information to the determined home telecommunications network to be handled directly thereby. Illustratively, at some point in time, the user de-registers the remotely located telephone. The roaming proxy is then notified, and the phone once again behaves like it is connected to the local switch.

Note: Some of the following abbreviations may be used in the figures and in descriptions thereof, each of which is fully familiar to those of ordinary skill in the art: ANSI-41 (An Intelligent Network protocol used by mobile networks in the United States); CAMEL (Customized Applications for Mobile Enhanced Logic, an Intelligent Network protocol used by GSM networks worldwide); HLR (Home Location Register); HSS (Home Subscriber Server); I-CSCF (Interrogating Call Session Control Function); IMS (IP Multimedia Subsystem); IN (Intelligent Network); INAP (Intelligent Network Application Part); P-CSCF (Proxy Call Session Control Function); S-CSCF (Serving Call Session Control Function); SCP (Service Control Point, a server in Intelligent Networks); SSP (Service Switching Point, a telecommunications network "switch"); and VLR (Visitor Location Register). (Other abbreviations, acronyms and terms-of-art, each of which is fully familiar to those skilled in the art, may also be used herein without explicit definition.)

Figure 1:
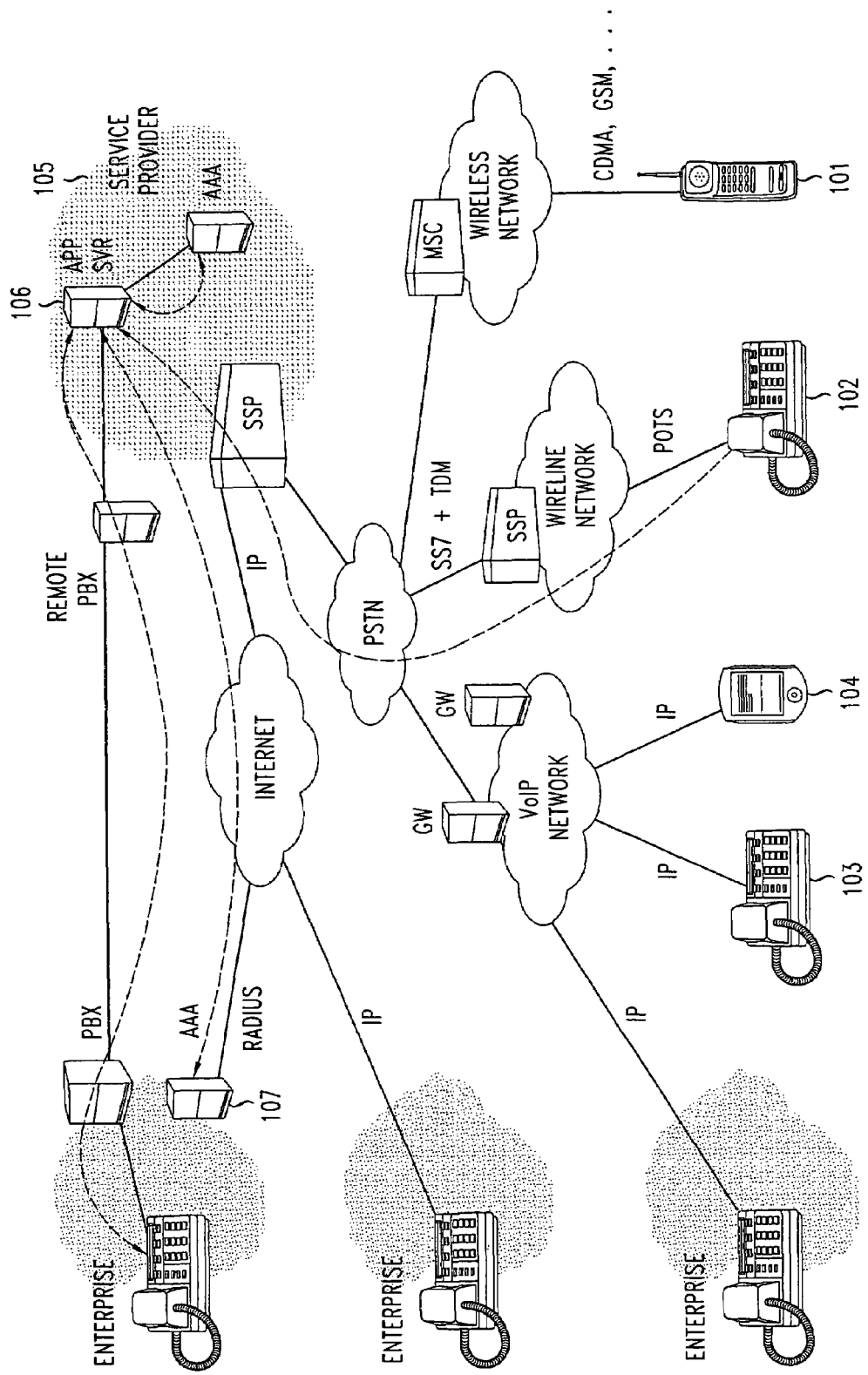
FIG. 1 shows an example telecommunications network in which a first illustrative embodiment of the present invention may be advantageously implemented, the first illustrative embodiment providing a limited capability using existing telecommunications network infrastructure.

FIG. 1 shows an example telecommunications network in which a first illustrative embodiment of the present invention may be advantageously implemented, the first illustrative embodiment providing a limited capability using existing telecommunications network infrastructure. In accordance with this illustrative embodiment of the invention, the user may advantageously use any existing phone, such as, for example, mobile phone 101, wireline phone 102, voice-over-IP phone 103, or voice-over-IP PDA 104, to call a service number, such as, for example, "1-800-MYPHONE." Service provider 105 runs an application server (App Server 106), for example, on top of a Parlay Gateway (fully familiar to those of ordinary skill in the art) or equivalent. The user's call advantageously triggers App Server 106. The user is then prompted for authentication information. Note that the user may be a direct customer of the service provider, or, alternatively, an employee of the enterprise who is the service provider's direct customer. The user may then be authenticated locally by the service provider, or, alternatively, may be authorized remotely by the enterprise. (Authorization by the enterprise may, for example, be done via AAA server 107 using the RADIUS protocol, each fully familiar to those of ordinary skill in the art.)

Once authenticated, the user receives a second dial tone. The user now uses the phone as his or her regular enterprise phone. For example, the user would now be able to dial a 4-digit number to reach someone inside the enterprise (assuming of course that internal enterprise calls may normally be dialed with use of a 4-digit number—typical functionality offered by a Centrex-based or a PBX-based enterprise telecommunications environment). In addition, App Server 106 allows the user to use other advanced features which are normally provided to internal enterprise users (e.g., multiple call appearances, call conferencing, etc.) by entering specific commands to do so, such as, for example, "star-codes." Thus, the user interface may be different from that of the regular phone, even though the full functionality will be available. Moreover, the user may optionally signal the App Server to forward calls coming to his or her regular phone to the current phone. Note, however, that the device used to place the call is unchanged—that is, it continues to receive calls at it's usual number, it is billed as usual, etc.

Figure 2:
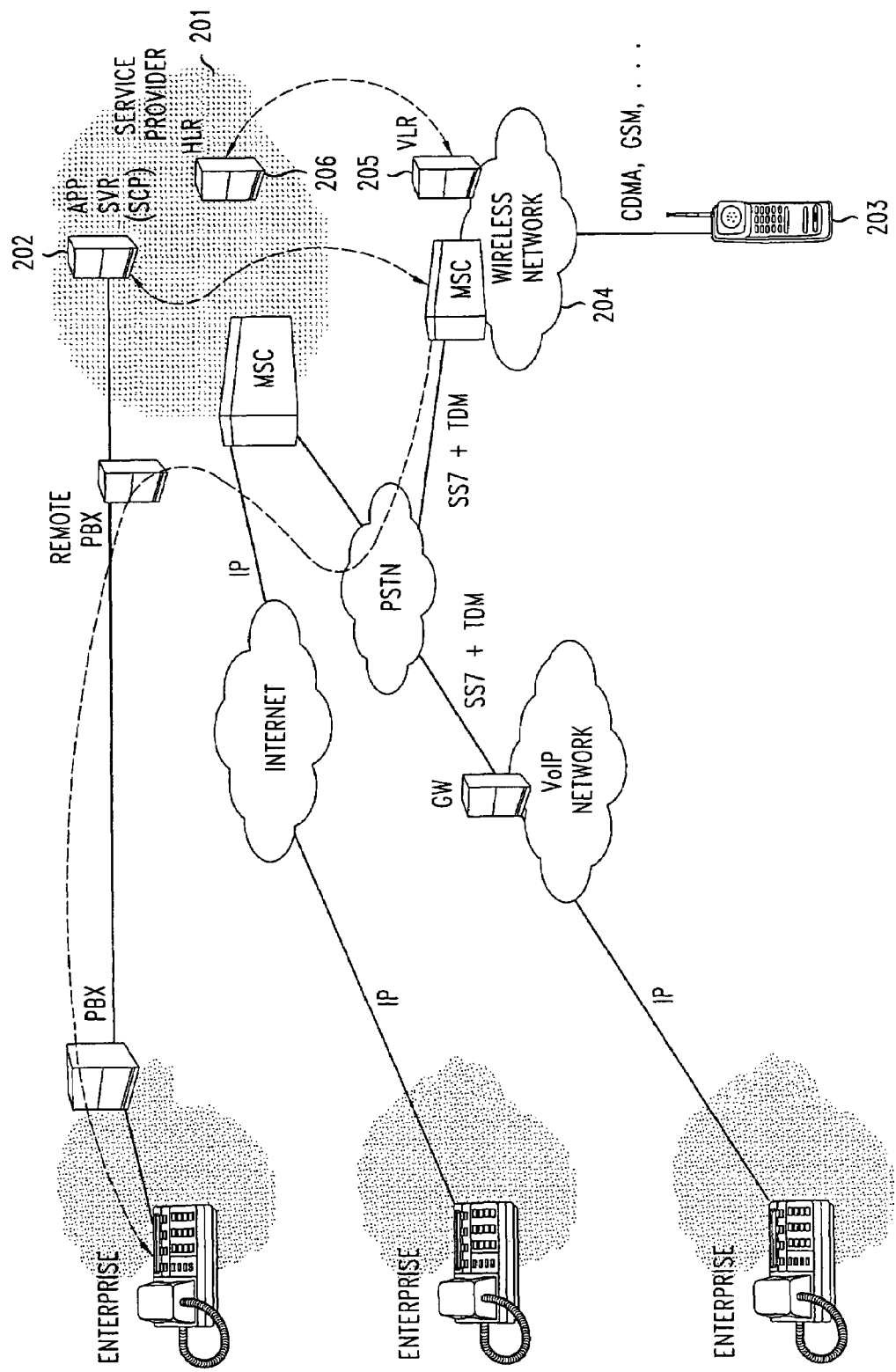
FIG. 2 shows an example telecommunications network in which a second illustrative embodiment of the present invention may be advantageously implemented, the second illustrative embodiment for supporting the use of mobile phones at remote locations.

FIG. 2 shows an example telecommunications network in which a second illustrative embodiment of the present invention may be advantageously implemented, the second illustrative embodiment for supporting the use of mobile phones at remote locations. In particular, this figure depicts how IN capabilities can be used to allow a user with a mobile phone to access his or her "regular" phone service. Service provider 201 deploys App Server 202 as an SCP. IN triggers are advantageously associated with the subscriber's mobile phone number (associated with mobile phone 203). (The actual IN protocol which may be used is CAMEL/ANSI-41, fully familiar to those skilled in the art, depending on the type of mobile network.) When the user's phone becomes active in a visited network such as wireless network 204, VLR 205 in the visited network sends IN messages to HLR 206 in the home network (i.e., service provider network 201, and retrieves profile information associated with the given subscriber. This information is advantageously used by the SSP in the visited network to communicate with SCP 202 in the home network. The SCP either knows how to serve the user, or communicates with, for example, a PBX, to serve the user. The user then advantageously sees all his or her "regular" phone features in his or her mobile phone. Incoming calls at the user's regular phone number will then advantageously cause the mobile phone to ring. (Note that the user does not need a separate phone number in the mobile phone and the "regular" phone. A single number may be associated with both devices.)

Figure 3:
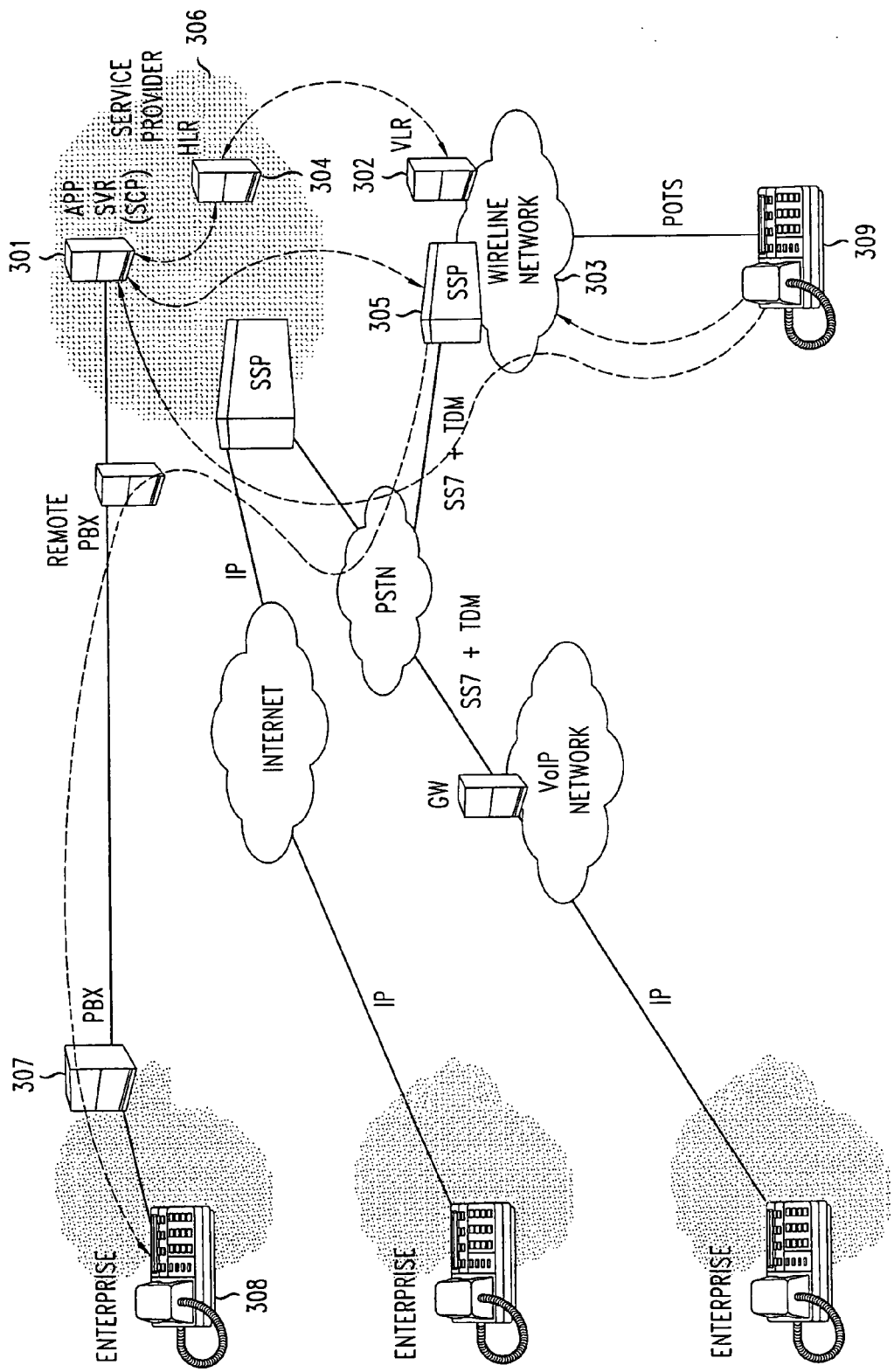
FIG. 3 shows an example telecommunications network in which a third illustrative embodiment of the present invention may be advantageously implemented, the third illustrative embodiment for supporting the use of wireline phones at remote locations.

FIG. 3 shows an example telecommunications network in which a third illustrative embodiment of the present invention may be advantageously implemented, the third illustrative embodiment for supporting the use of wireline phones at remote locations. In particular, this figure depicts how IN capabilities can be used to allow a user with access to a wireline phone can use it like his or her "regular" phone. Telecommunications service provider 306 deploys App Server 301 as an SCP. The user calls a predetermined service number (e.g., "1-800-MYPHONE"), and the incoming call triggers the App Server. The user is then advantageously prompted for authentication information, and may be authenticated as described above. If successful, IN triggers specifying the user's particular services are advantageously associated with the subscriber's current phone number. The App Server signals VLR 302 (in wireline network 303, from which the user is calling) to retrieve user service profile information from HLR 304. This information is used by SSP 305 (in visited wireline network 303) to communicate with SCP 301 in the home network (operated by service provider 306). The SCP either knows how to serve the user, or communicates with, for example, PBX 307 to serve the user. Thus, the user advantageously sees all of his or her "regular" phone features in the remote phone. For example, incoming calls at the user's regular phone number (phone 308) will cause the remote phone (phone 309) to ring. Incoming calls to the remote phone (phone 309) will either be diverted to an announcement server or to voice mail, or, alternatively, may ring through with distinctive ringing. (In accordance with another illustrative embodiment of the present invention, a mobile network may use a similar approach to allow the user to borrow someone else's mobile phone and use it as a remote phone.) Finally, at some later time, the association between the user and the remote phone may be terminated, typically by calling the App Server. Subsequent to such a termination, the remote phone will resume behaving as usual.

FIG. 4 shows an example telecommunications network in which a fourth illustrative embodiment of the present invention may be advantageously implemented, the fourth illustrative embodiment for supporting the use of PBX extensions. FIG. 4A in particular shows access to a "home" PBX extension. PBX users who step out of their office would like the ability to access their "regular" PBX-based phone service from outside. Thus, in accordance with one illustrative embodiment of the present invention, App Server 401 in the network of service provider 402 is able to communicate with PBX 403 by interfacing the App Server to "remote PBX" 404 that speaks a standard protocol to App Server 401, and a different (possibly proprietary) protocol to PBX 403. App Server 401 advantageously uses this interface to pass on signaling information from an authenticated PBX user (not shown) to PBX 403.

FIG. 4B shows the use of a PBX extension at remote locations. Users want to access their "regular" service from a phone that is behind a PBX (e.g., at a hotel). Thus, in accordance with one illustrative embodiment of the present invention, PBX 405 forwards signaling information to App Server 406 when a user attempts to use her "regular" service remotely. This may be achieved by creating App Server 407 (in or associated with PBX 405) that interfaces to App Server 406 in the network of service provider 408. The user advantageously signals (e.g., through an escape sequence) to PBX 405 that he or she wants to use his or her "regular" service remotely. App Server 407 advantageously tunnels all signaling to App Server 406 in the network (of service provider 408), using a predetermined protocol.

FIG. 4C shows the use of PBX systems with IMS architectures. Note that as PBXs move to the IMS architectural model, this inter-working can be set up quite naturally. In particular, PBX 409 implements an App Server 410 and a P-CSCF 411. The user interacts with App Server 410 and indicates his or her need to connect through to his or her "regular service". App Server 410 then advantageously triggers P-CSCF 411 to tunnel through to the user's S-CSCF 412 to offer his or her regular service.

Figure 5:
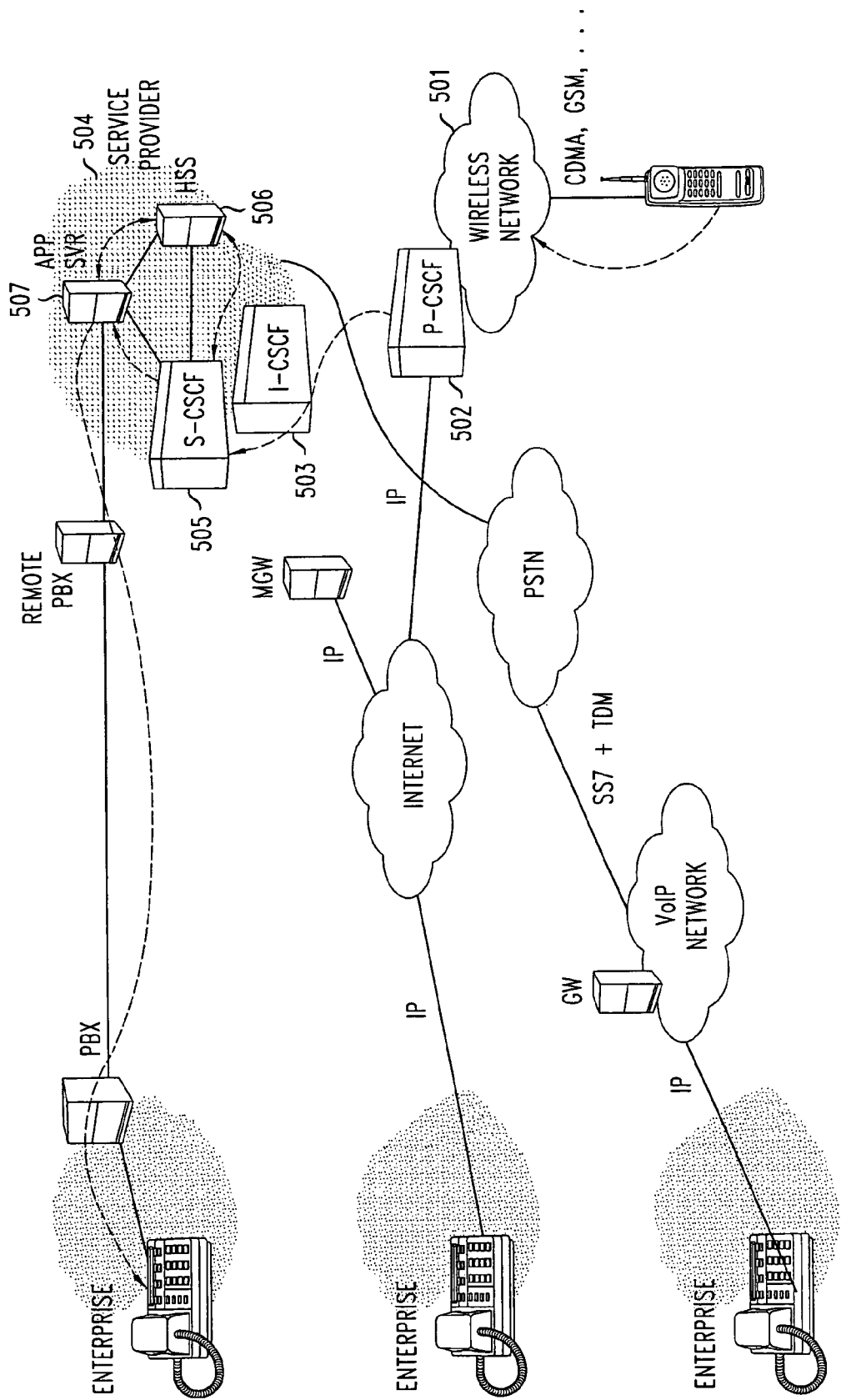
FIG. 5 shows an example telecommunications network in which a fifth illustrative embodiment of the present invention may be advantageously implemented, the fifth illustrative embodiment for supporting the use of mobile phones at remote locations when the wireless network implements an IMS architecture.

FIG. 5 shows an example telecommunications network in which a fifth illustrative embodiment of the present invention may be advantageously implemented, the fifth illustrative embodiment for supporting the use of mobile phones at remote locations when the wireless network implements an IMS architecture. Note that the 3GPP (3rd Generation Partnership Project) standards body has proposed IMS as an architecture for all future wireless networks. As is well known to those of ordinary skill in the art, the core idea in IMS is that all signaling information always travels from the subscriber's device to the home network, and all services are implemented in the home network. When a user turned his or her mobile phone on in an IMS-enabled visited network (such as wireless network 501), the mobile notifies a P-CSCF (such as P-CSCF 502), that locates an I-CSCF (such as I-CSCF 503) in the home network (of service provider 504), which connects it through to an S-CSCF (such as S-CSCF 505). The S-CSCF uses user profile information from an HSS (such as HSS 506), and an App Server (such as App Server 507) to actually implement the services. A user thus always has his or her "regular" phone service in his or her mobile device. The same principles employed in the illustrative embodiment of the present invention for supporting the use of wireline phones at remote locations as shown in FIG. 3 can be then used to allow the user to use a different device to access the same service, as shown in the illustrative embodiment of FIG. 5.

Figure 6:
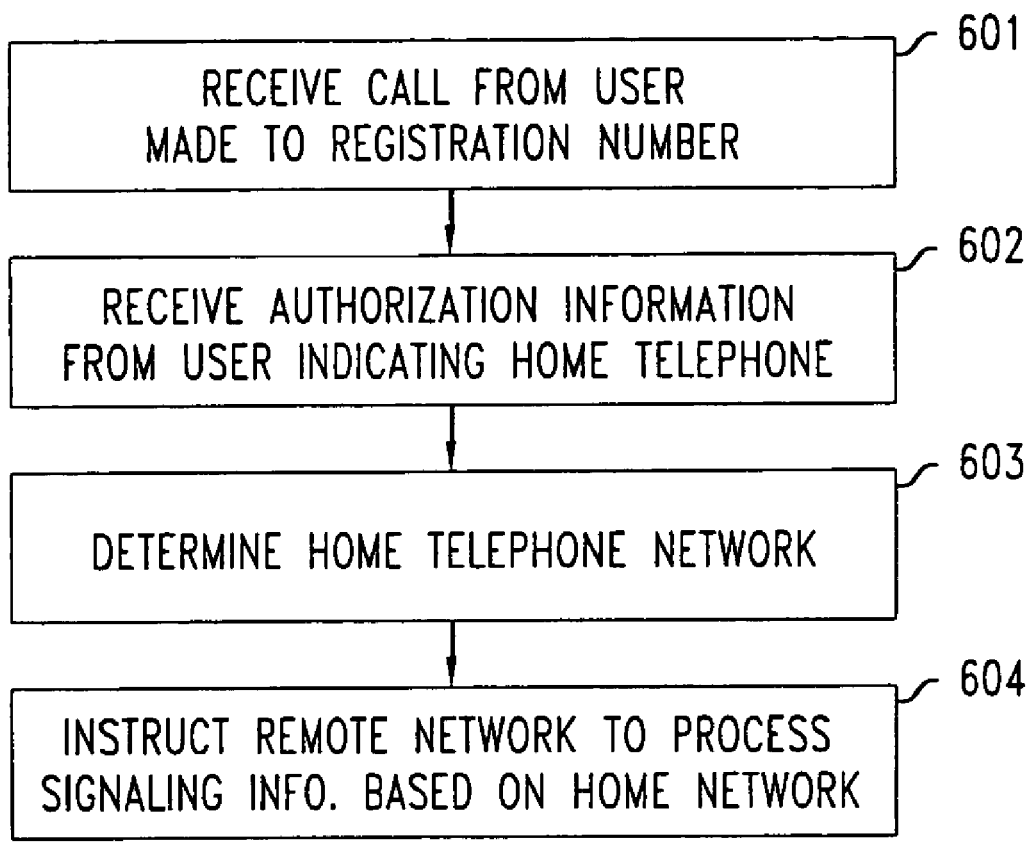
FIG. 6 shows a flowchart of a method for performing wireline "roaming" in accordance with one illustrative embodiment of the present invention.

FIG. 6 shows a flowchart of a method for performing wireline "roaming" in accordance with one illustrative embodiment of the present invention. First, in block 601, a call is received from the user, the call being made from a "remote" telecommunications device (e.g., a wireline phone other than the user's "home" telephone or from a wireless phone) to a predetermined registration telephone number. Then, in block 602, authentication information is received from the user indicating the user's association with a particular home telecommunications environment. Next, in block 603, the home telecommunications network associated with the given home telecommunications environment is determined based on the received authentication information. Finally, in block 604, the telecommunications network associated with the remote telecommunications device from which the user placed the call is instructed to process signaling information associated with the user's use of the remote telecommunications device based on the determined home telecommunications network. For example, in accordance with one illustrative embodiment of the present invention in which an IN (Intelligent Network) architecture is employed, the remote telecommunications network may interpret the signaling information based on information received from the determined home telecommunications network. In accordance with another illustrative embodiment of the present invention in which an IMS (IP Multimedia Subsystem) architecture is employed, the remote telecommunications network may redirect the signaling information to the determined home telecommunications network to be handled directly thereby.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for emulating a home telecommunications environment for a user associated with said home telecommunications environment, the home telecommunications environment comprising a home telecommunications network, the user located at a remote telecommunications device, the remote telecommunications device associated with a different telecommunications network than said home telecommunications network, the method comprising the steps of:

receiving a request from the user to initiate emulation of the home telecommunications environment;

receiving authentication information from the user indicating the user's association with the home telecommunications environment;

determining the home telecommunications network which is associated with the given home telecommunications environment;

instructing the telecommunications network associated with the remote telecommunications device to process signaling information associated with the user's use of the remote telecommunications device based on the determined home telecommunications network, thereby emulating the home telecommunications environment for the user;

redirecting incoming calls directed to the user within said home telecommunications environment to the remote telecommunications device; and blocking incoming calls directed to the remote telecommunications device except for said incoming calls directed to the user within said home telecommunications environment.

2. The method of claim 1 wherein the telecommunications network associated with the remote telecommunications device and the home telecommunications network are implemented with an IMS architecture.

3. The method of claim 2 wherein the step of instructing a telecommunications network associated with the remote telecommunications device to process signaling information associated with the user's use of the remote telecommunications device based on the determined home telecommunications network comprises instructing the telecommunications network associated with the remote telecommunications device to redirect said signaling information associated with the user's use of the remote telecommunications device to the determined home telecommunications network.

4. The method of claim 1 wherein the telecommunications network associated with the remote telecommunications device and the home telecommunications network are implemented with an IN architecture.

5. The method of claim 4 wherein the step of instructing a telecommunications network associated with the remote telecommunications device to process signaling information associated with the user's use of the remote telecommunications device based on the determined home telecommunications network comprises instructing the telecommunications network associated with the remote telecommunications device to redirect said signaling information associated with the user's use of the remote telecommunications device to the determined home telecommunications network.

6. The method of claim 1 wherein the home telecommunications network comprises a Centrex-based network.

7. The method of claim 1 wherein the home telecommunications network comprises a PBX-based telecommunications network.

8. The method of claim 1 wherein the remote telecommunications device comprises a wireline telephone.

9. The method of claim 8 wherein the telecommunications network associated with the remote telecommunications device comprises a PBX network and wherein the remote telecommunications device comprises a PBX network based telephone.

10. The method of claim 1 wherein the telecommunications network associated with the remote telecommunications device comprises a wireless telephone network and wherein the remote telecommunications device comprises a wireless telephone.

11. The method of claim 1 wherein the step of receiving a request from the user to initiate emulation of a home telecommunications environment comprises receiving a call from the user made to a predetermined registration telephone number.

12. The method of claim 11 further comprising the step of requesting said authorization information from said user in response to receiving said call from the user.

13. The method of claim 1 wherein the home telephone network and the telecommunications network associated with the remote telecommunications device are operated by respective different service providers which have entered into a wireline roaming agreement.

14. The method of claim 1 further comprising the steps of:
receiving a request from the user to discontinue emulating the telecommunications environment for the user; and
instructing the telecommunications network associated with the remote telecommunications device to cease processing signaling information associated with the user's use of the remote telecommunications device based on the determined home telecommunications network.

15. An apparatus for providing an emulation of a home telecommunications environment for a user associated with said home telecommunications environment, the home telecommunications environment comprising a home telecommunications network, the user located at a remote telecommunications device, the remote telecommunications device associated with a different telecommunications network than said home telecommunications network, the apparatus comprising:
means for receiving a request from the user to initiate emulation of the home telecommunications environment;
means for receiving authentication information from the user indicating the user's association with the home telecommunications environment;
means for determining the home telecommunications network which is associated with the given home telecommunications environment;
means for instructing the telecommunications network associated with the remote telecommunications device to process signaling information associated with the user's use of the remote telecommunications device based on the determined home telecommunications switch, thereby emulating the home telecommunications environment for the user;
means for redirecting incoming calls directed to the user within said home telecommunications environment to the remote telecommunications device; and
means for blocking incoming calls directed to the remote telecommunications device except for said incoming calls directed to the user within said home telecommunications environment 16. The apparatus of claim 15 wherein the telecommunications network associated with the remote telecommunications device and the home telecommunications network are implemented with an IMS architecture, and wherein the means for instructing a telecommunications network associated with the remote telecommunications device to process signaling information associated with the user's use of the remote telecommunications device based on the determined home telecommunications network comprises means for instructing the telecommunications network associated with the remote telecommunications device to redirect said signaling information associated with the user's use of the remote telecommunications device to the determined home telecommunications network.

17. The apparatus of claim 15 wherein the telecommunications network associated with the remote telecommunications device and the home telecommunications network are implemented with an IN architecture, and wherein the means for instructing a telecommunications network associated with the remote telecommunications device to process signaling information associated with the user's use of the remote telecommunications device based on the determined home telecommunications network comprises means for instructing the telecommunications network associated with the remote telecommunications device to redirect said signaling information associated with the user's use of the remote telecommunications device to the determined home telecommunications network.

18. The apparatus of claim 15 wherein the home telecommunications network comprises a Centrex-based network.

19. The apparatus of claim 15 wherein the home telecommunications network comprises a PBX-based telecommunications network.

20. The apparatus of claim 15 wherein the remote telecommunications device comprises a wireline telephone.

21. The apparatus of claim 20 wherein the telecommunications network associated with the remote telecommunications device comprises a PBX network and wherein the remote telecommunications device comprises a PBX network based telephone.

22. The apparatus of claim 15 wherein the telecommunications network associated with the remote telecommunications device comprises a wireless telephone network and wherein the remote telecommunications device comprises a wireless telephone.

* * * * *